United States Patent [19]
Cunha et al.

[11] 3,722,999
[45] Mar. 27, 1973

[54] COPYING APPARATUS HAVING CASSETTE AND CUTTING MEANS

[75] Inventors: Harold Cunha, Pittsford; William M. Dickman, Canandaigua; Daniel H. Robbins, Rochester, all of N.Y.

[73] Assignee: Itek Corporation, Lexington, Mass.

[22] Filed: Aug. 19, 1971

[21] Appl. No.: 173,194

[52] U.S. Cl. ..................355/45, 355/13, 355/29, 355/72
[51] Int. Cl. .............................................G03b 27/58
[58] Field of Search ..........355/13, 28, 29, 45; 95/65, 95/66; 355/66, 72; 83/508, 203, 205

[56] References Cited

UNITED STATES PATENTS

| | | | |
|---|---|---|---|
| 3,535,038 | 10/1970 | Stievenart et al. | 355/28 X |
| 1,794,347 | 2/1931 | Caps et al. | 355/72 X |
| 3,621,748 | 11/1971 | Felstehausen | 83/508 |
| 2,432,704 | 12/1947 | Warman | 355/45 |
| 2,226,618 | 12/1940 | Küppenbender | 355/45 |
| 3,167,996 | 2/1965 | Adler | 355/28 |
| 3,463,585 | 8/1969 | Levine | 355/45 |
| 3,526,458 | 9/1970 | Meyers et al. | 355/45 |
| 1,814,390 | 7/1931 | Johnson | 355/72 |
| 3,600,083 | 8/1971 | Leedom | 355/13 |
| 3,527,151 | 9/1970 | Harrison | 95/96 |

Primary Examiner—Samuel S. Matthews
Assistant Examiner—E. M. Bero
Attorney—Homer O. Blair et al.

[57] ABSTRACT

Reader-printer apparatus for viewing an image of the information stored on a data storage medium and for producing large sized, uniform intensity, printed copies of that information. The apparatus is designed to permit both viewing and printing to be accomplished at a single imaging station on the machine, eliminating the need for expensive movable optics. Photosensitive printing paper is supplied to the imaging station by means of a reusable cassette conveniently mounted to the machine. A disc-shaped cutting blade on the machine is adapted to cooperate with a stationary blade on the cassette to smoothly and rapidly cut the exposed paper in a manner so as to minimize paper waste due to fogging, jamming or tearing. The machine is particularly designed to produce high quality uniform intensity prints in a substantially large size format.

12 Claims, 7 Drawing Figures

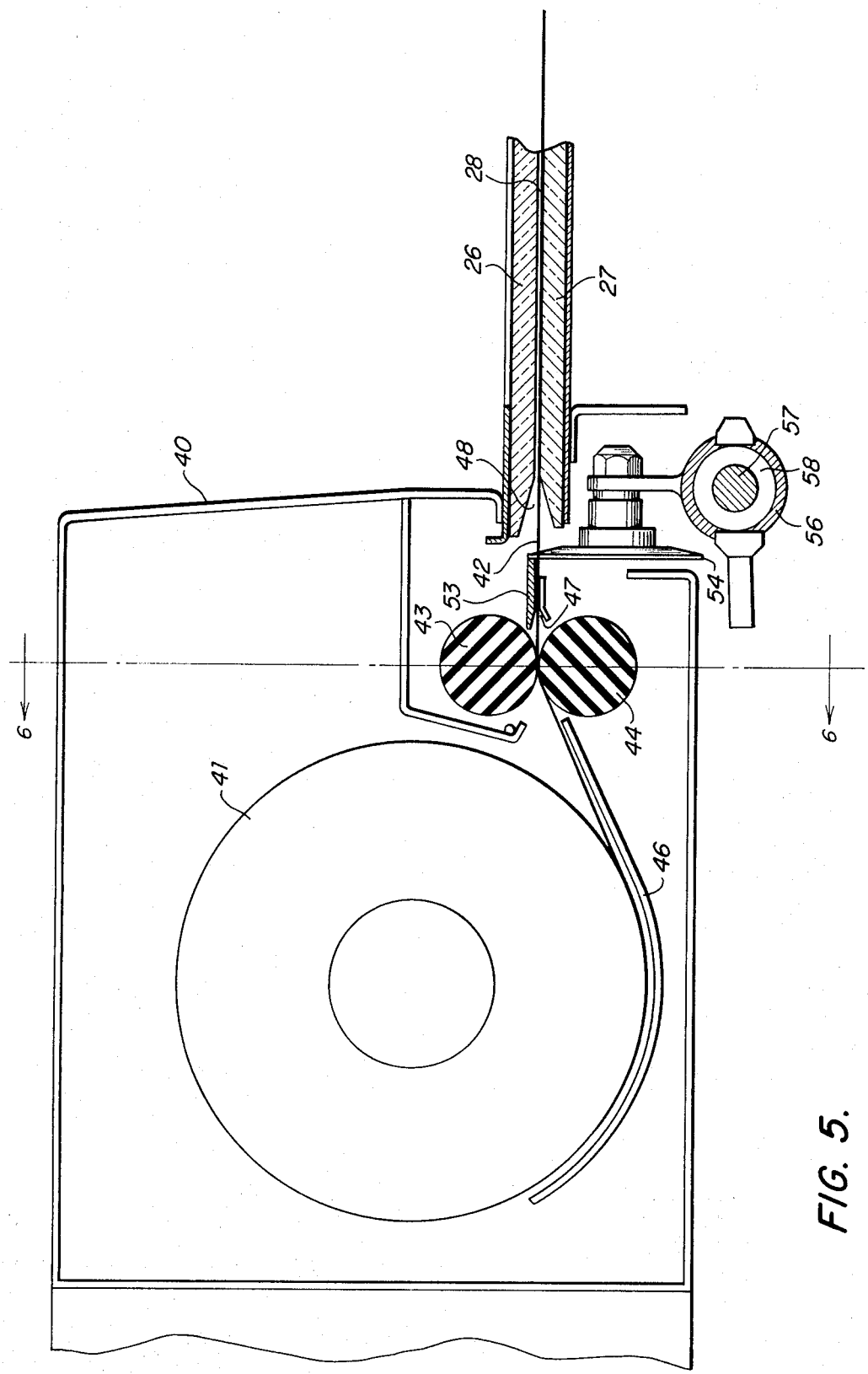

3,722,999

COPYING APPARATUS HAVING CASSETTE AND CUTTING MEANS

BACKGROUND OF THE INVENTION

1. Field of the Invention

The present invention relates generally to equipment known as microfilm reader-printers. More specifically, the invention relates to apparatus for viewing an enlarged image of the information stored on a small transparency and for making a photographic print of that information.

2. Description of the Prior Art

The use of microfilm as a means for recording and storing information has become widespread over the past several years and new applications for its use are continually being found. As a result of this rapid growth, however, there has been an increasing demand for better equipment to retrieve the varied types of information that may be advantageously stored on microfilm. What is generally required is a machine that can, in a convenient and efficient manner, provide a good quality enlarged image of microfilmed information both on a screen for viewing and on photosensitive paper for reproduction. The machines presently known in the prior art, however, are not fully satisfactory for several reasons.

Initially, these machines are generally quite complex and expensive and have many movable parts in both their mechanical and optical components. For example, most prior art machines employ separate viewing and printing stations thus necessitating the employment of large movable mirrors and associated motors to "steer" an image from one station to the other. Additionally, in the operation of many prior art machines, there is often a substantial waste of photosensitive paper due to fogging, jamming, and tearing caused by poor feeding of the paper to a printing position as well as inefficient cutting of the exposed paper. In addition to increasing operating expenses and wasting operator time this can also result in serious damage to the machine. Finally, machines presently on the market are not fully adequate to produce high quality reproductions in a large format which renders then wholly unacceptable in many applications. Most prior art machines, for example, are not capable of providing prints of engineering or architectural drawings in desired sizes of 24 inches × 36 inches while, at the same time, accurately reproducing all the fine lines and symbols usually contained thereon. This particular difficulty is primarily attributable to the $\cos^4$ law of optics which results in peripheral areas of the greatly enlarged image being of low intensity and quality.

SUMMARY OF THE PREFERRED EMBODIMENT

In accordance with a preferred embodiment of the present invention a novel reader-printer is provided that overcomes many of the problems referred to above. In particular, the reader-printer according to the present invention is designed to permit both viewing and parting to be carried out at the same location on the machine thus requiring only a single stationary image projection system. This reduces the expense of the machine, simplifies alignment procedure and generally makes it less susceptible to breakdown. As a further aspect of the invention, a novel reusable cassette for storing a roll of photosensitive printing paper is provided. The design of the cassette in conjunction with a novel paper cutting apparatus associated with both the machine and the cassette minimizes the amount of wasted paper due to tearing and fogging. Finally, the present invention enables the production of high quality images in a substantially large format thus readily lending itself to many applications heretofore not readily available to microfilming, such as the reproduction of engineering and architectural drawings, large posters and the like.

In general, the present invention provides a microfilm reader-printer that provides good high quality reproductions, that is economical to manufacture and use, that has an attractive appearance, that is easy to reload and supply with necessary reproduction supplies and that has easy access for routine maintainence.

BRIEF DESCRIPTION OF THE DRAWINGS

FIG. 5 illustrates, in cross-section, the photosensitive paper supply cassette of the present invention viewed in the direction of arrows 5—5 in FIG. 6.

DETAILED DESCRIPTION OF THE PREFERRED EMBODIMENT

Figure 1:
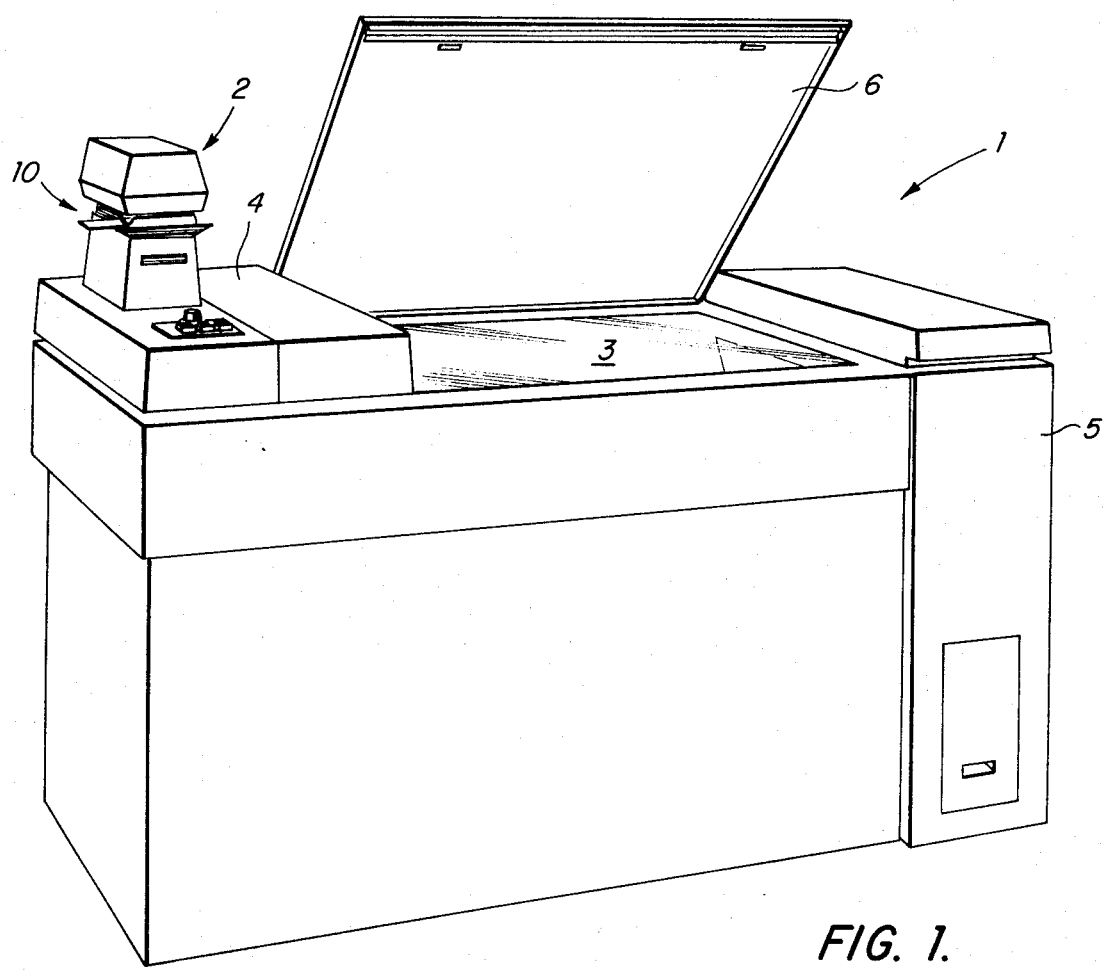
FIG. 1 illustrates a reader-printer apparatus in accordance with the present invention.

FIG. 1 illustrates a reader-printer apparatus according to the presently preferred embodiment of the present invention. Included within this machine, generally designated by the reference numeral 1, are all the components needed to both view the information stored on a medium such as microfilm and to provide high quality fully processed printed copies of that information. As illustrated in FIG. 1, these components basically include structure 2 for mounting and positioning the microfilm, an imaging area or station 3, photosensitive paper supply cassette at 4, and processor 5. Also included within the machine and located both within structure 2 and the main housing is an optical system for forming an image of the microfilmed data at the imaging station 3.

Figure 3:
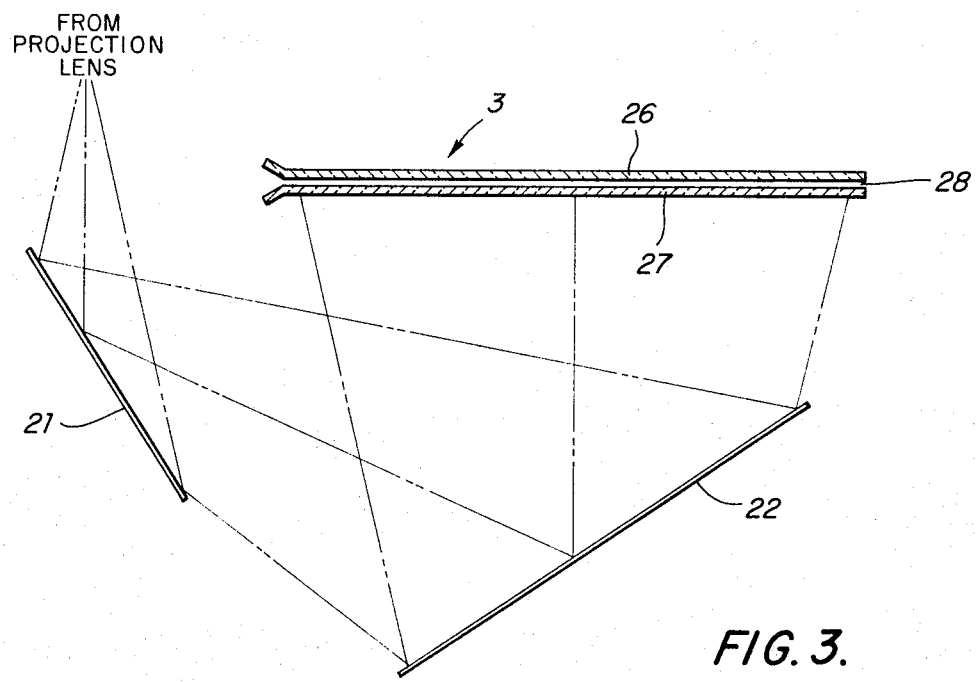
FIGS. 2 and 3 illustrate the preferred optical system employed in the reader-printer of FIG. 1.
Figure 2:
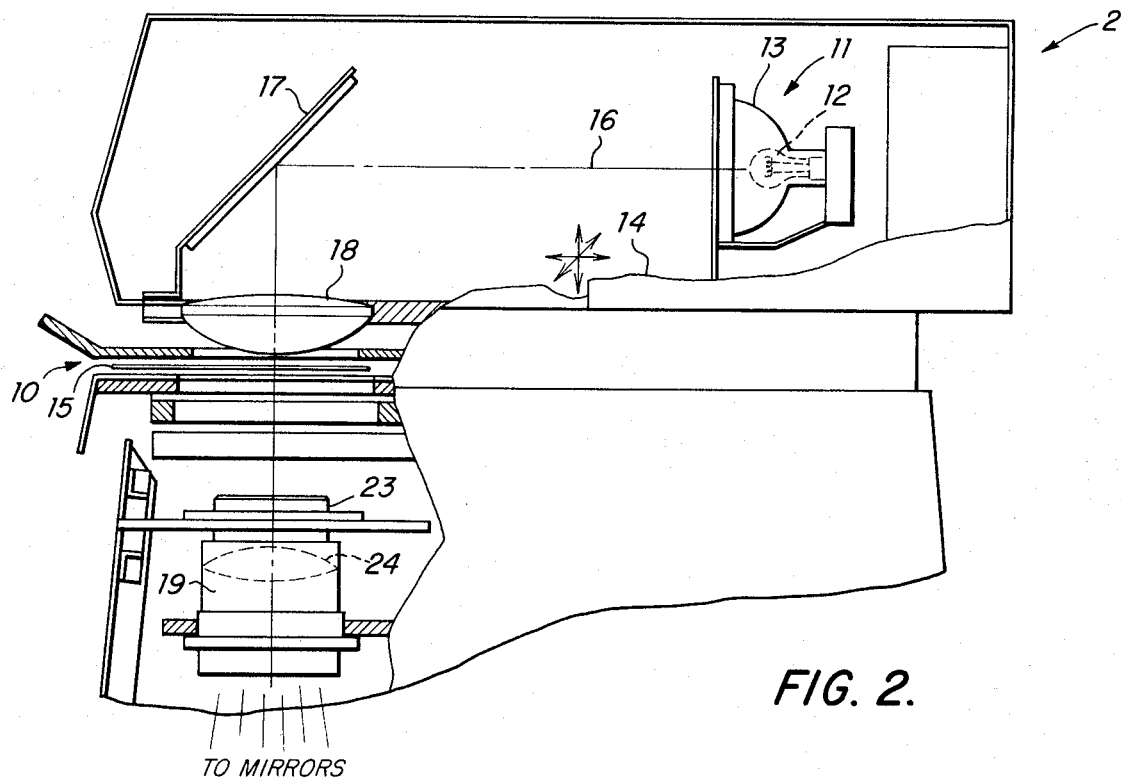

A preferred optical system which may advantageously be employed in the reader-printer of the present invention is illustrated in FIGS. 2 and 3. As shown in FIG. 2, a film gate 10 is provided within structure 2 to support any conventional data bearing medium such as a 35 mm microfilm aperture card 15 containing the information to be reproduced. This aperture card is illuminated by a lamp assembly 11 which comprises a bulb 12 positioned adjacent a reflector 13. This reflector is preferably substantially elliptical in cross-section and has a circular opening approximately 2 inches in diameter. Such a light source has the property of producing a slowly diverging beam of light which is approximately 20 percent more intense around its periphery than in its center which is advantageous for a reason to be explained more fully hereinafter.

The light beam from the light source 11 is turned through 90° by mirror 17 and directed through a condensor 18 which condenses the light into a beam having a cross-sectional diameter just sufficient to cover all the data on the microfilm. To permit adjustment of the beam diameter for different orientations of the data and also to permit slight control over the intensity of the final image, the lamp assembly 11 is mounted as indicated schematically at 14 to enable movement in all directions about the optical axis 16 of the system as indicated in part by the arrows. The light passing through the microfilm is then collected by a suitable projection lens system 19, and a focussed image is formed at imaging station 3 by means of mirrors 21 and 22 (see FIG. 3).

Figure 4:
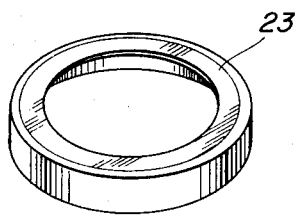
FIG. 4 illustrates a vignetting ring as employed in the optical system.

In order to produce an image at imaging station 3 that is bright and of substantially uniform intensity throughout, a technique known as vignetting is employed and a vignetting ring 23 is mounted to the projection lens system preferably in advance of the first lens 24 of the system. This vignetting ring, shown more clearly in FIG. 4, acts to obstruct light rays directed toward the lens system at an oblique angle relative to the optical axis of the system, and, in conjunction with the intensity profile of the illuminating light, will effectively compensate for the $\cos^4$ law and produce a greatly enlarged high quality, uniform intensity image at imaging station 3.

Further details of this optical system may be found in copending, commonly assigned application, Ser. No. 173,199 to Henry N. Fairbanks filed Aug. 19, 1971, and entitled Optical System for Projecting A Very Large Uniformly Illuminated Image of Microfilm Data which application is hereby incorporated by reference. It should be understood that the present invention is not necessarily limited to this particular optical system, but could readily employ different systems.

Figure 7:
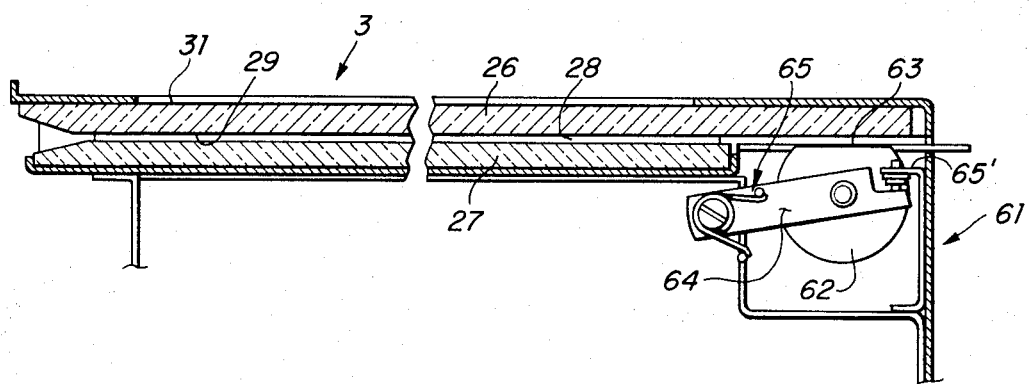
FIG. 7 illustrates the imaging station of the present invention.

In FIG. 7 the imaging station 3, schematically shown in FIG. 3, is illustrated in greater detail. As mentioned previously, this station is designed to enable both viewing and printing to be accomplished at the same location on the machine thus eliminating the need for large movable mirrors along with associated motors and controls to "steer" the image between separate viewing and printing locations. The present structure as a result of its design, provides the compactness, economy and accuracy desired in machines of this type.

As illustrated in FIG. 7, the imaging station includes a pair of substantially parallel plates 26 and 27 defining a narrow space 28 therebetween. Upper plate 26 is constructed of transluscent material such as ground or coated glass and is capable of producing a clear image thereupon for viewing the information stored on the microfilm aperture card 15. Lower plate 27, on the other hand, is transparent and is provided to support a sheet of photosensitive paper within the narrow space 28 as will be described more fully hereinafter. Since lower plate 27 is transparent, light will pass directly through it and, in the absence of any paper in space 28, an image will be formed on the lower surface 29 of the upper plate 26. This image can then be viewed by looking down on upper surface 31 of the plate. Although it is clear that what will be seen is a mirror image of the information stored on the microfilm, this is fully satisfactory for most reading requirements and to determine whether a printed copy of the data is desired and if the image is properly aligned and in focus. Of course, by merely turning the aperture card around, a proper image may be obtained for viewing. In this arrangement, the system may also be readily used as a tracing table for tracing onto transluscent paper or other material. As yet another alternative, a mirror, of, for example, light weight aluminum may be attached to the lower surface of lid 6 (FIG. 1) so that a correct image may be viewed through the mirror without turning the microfilm around.

When it has been decided that a printed copy of the information is desired, it becomes necessary to merely lower the lid 6 of the machine, insert a sheet of photosensitive paper into space 28 between the plates, and expose the paper through the transparent support plate 27. Thus, in accordance with the present invention, both viewing and printing may be rapidly and easily accomplished in the same location without needing any movement or alteration of the optical system as is required in most prior art machines.

Figure 6:
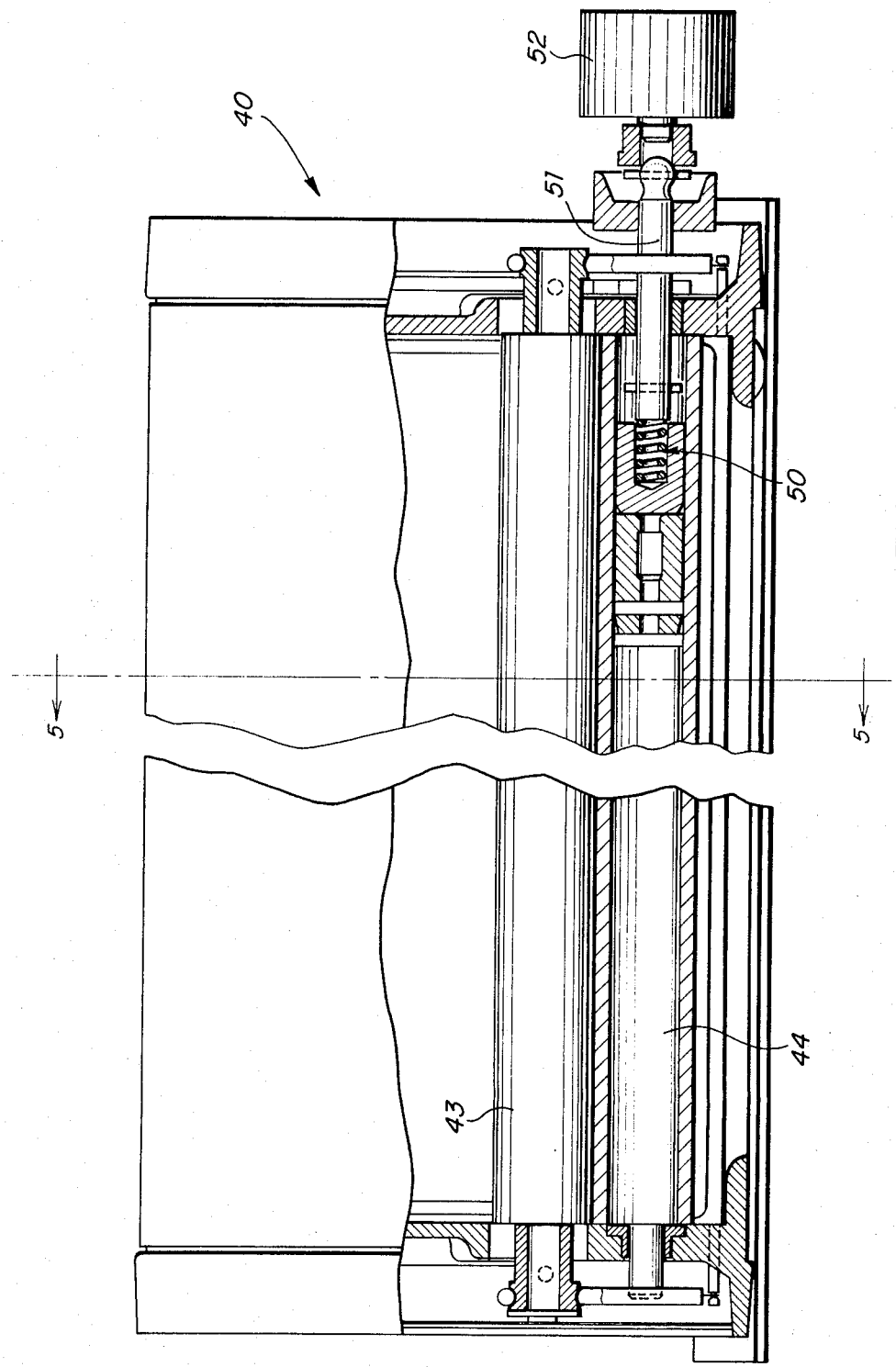
FIG. 6 illustrates the photosensitive paper supply cassette looking in the direction of arrows 6—6 in FIG. 5.

In FIGS. 5 and 6 are illustrated the preferred structure for supplying and positioning the photosensitive paper into the narrow space 28 of the imaging station 3. This structure primarily comprises a reusable photosensitive paper supply cassette which cassette includes a substantially enclosed housing 40 adapted to support a roll of photosensitive paper 41 therein. As shown more clearly in FIG. 5, the leading edge 42 of this roll of paper is directed between a pair of rollers 43 and 44 by means of a suitable guide 46. These rollers are mounted inside the cassette housing and are positioned adjacent a narrow exit slot 47 of the housing to guide the leading edge of the paper out of the housing and into the space between plates 26 and 27. These plates are provided with a V-shaped slot 48 as shown to assist in guiding the paper into the space 28. The structure of the rollers 43 and 44 may be better understood with reference to FIG. 6. As shown, the pair of rollers are mounted to the side walls of the cassette so as to be capable of rotation and extend at least the width of the photosensitive paper being used, e.g. 24 inches. The upper roller 43 is freely rotatable in either direction as paper is being fed between the rollers while the lower roller 44 is designed as a drive roller and has a shaft 51 axially coupled thereto and extending outwardly through the cassette housing. This shaft is coupled to a motor by appropriate structure (not shown) which motor is time controlled to automatically feed a predetermined length of paper out of the cassette and into the space 28 for printing. Also coupled to the shaft 51 is a knob or handle 52 to permit manual rotation of the roller in either a clockwise or counterclockwise direction. This handle may be used instead of the motor but is primarily employed to feed small amounts of paper either out of or into the cassette at the beginning and end of an operation.

The shaft 51 also provides an additional function in that it is used to help align the cassette within the machine by cooperating with a suitable slot in the machine. In this regard, a spring 50 is provided between the shaft and roller to ensure proper engaging pressure and to take up locating tolerances.

The pair of rollers 43 and 44 may be constructed of any material capable of providing good frictional contact with the photosensitive paper to ensure a smooth feed of the paper out of the cassette. In the preferred embodiment the upper roller has been given a steel surface while the lower roller is provided with a rubber surface. By being mounted directly adjacent to the output slot of the cassette, these rollers additionally act as a light shield to prevent light from entering into the cassette and exposing the photosensitive paper therein. Also, these rollers are adapted to be separated by suitable structure not shown to assist in positioning the photosensitive paper therebetween and for general maintenance purposes.

After a suitable length of photosensitive paper has been fed into narrow opening 28 between plates 26 and 27 it is exposed by turning on the lamp assembly. At this time, the exposed paper is then ready to be cut from the roll to be processed and a novel cutting mechanism is provided to efficiently accomplish this.

Referring again to FIG. 5, the exit slot 47 of the cassette is formed in part by a rigid stationary blade member 53 extending the length of the cassette. This blade is adapted to cooperate with rotatable cutting blade 54 mounted on the main body of the machine. This cutting blade or knife comprises a rotatable disc-shaped element 54 which is both rotatable about its axis and also capable of being moved logitudinally across the width of the photosensitive paper. As shown in FIG. 5, this cutting blade is coupled at its axis to a ring shaped member 56 which in turn surrounds a stationary rod or bar 57 extending the width of the paper to define a bearing or bushing 58 between the rod and the ring. This rod and ring are coupled to a suitable solenoid and upon actuation of this solenoid, the knife 54 is propelled along the length of the rod and across the full width of the paper. The knife is designed to project slightly above the level of the paper 42 as shown and is also slightly biased against stationary blade 53, such that a rapid rotation will be applied to the knife as it is being driven along the width of the paper, thus ensuring a smooth even cutting of the paper. The drive mechanism for the cutting blade does not form part of the present invention and, accordingly, has been been described in detail. It should be understood, however, that other various well-known techniques for driving the blade may also be employed.

After the paper has been cut as described above it is then ready to be fed into the processing section 5 of the reader-printer to be processed in a conventional manner. The paper is fed to the processor by means of structure 61 illustrated in FIG. 7. As shown, this structure comprises a flattened drive roller 62 rotatably coupled to pivotable arm 64. Upon rotation of roller 62 by a drive motor (not shown) the curved portion of the roller drives the exposed paper into the processor. Spring 65 maintains the pivotable arm against stop 65' in the position shown.

In summary, the complete operation of the system may now be briefly described. Initially, an aperture card, microfilm roll, or other medium containing data to be imaged is positioned within film gate 10. This medium is then appropriately illuminated to form an image of the data at imaging station 3 where it may be viewed by looking through transluscent plate 26.

If, after examining the image, a printed copy is desired, the lid 6 of the machine is closed, a predetermined length of photosensitive paper is fed into the narrow space 28 between the plates 26 and 27, and the paper exposed. Cutting blade 54 is then actuated to cut the exposed sheet of paper, and the drive roller 62 is actuated to feed the exposed paper into the processor 5.

In general, the above-described reader-printer permits very large, high quality copies of microfilmed information to be reproduced with uniform density throughout and to be printed rapidly and with a minimum of inconvenience. The cassette is reusable, quickly reloadable and can easily be mounted to the machine in proper alignment. Photosensitive paper can be rapidly and automatically fed to the imaging station 3 with a minimum possibility of getting tangled or torn. The novel cutting arrangement permits the paper to be cut directly along the edge of the cassette thus reducing waste due to fogging or undesired exposure to light. By means of the manually operated knob 52, it becomes a simple matter to manually feed small amounts of paper back into the cassette at the end of an operation as desired to greatly reduce the possibility of paper being mutilated upon cassette removal and subsequent handling to create subsequent jamming problems upon later use.

The system is also particularly suitable to produce high quality uniform intensity images in a large size format making it readily applicable to many new applications including the reproduction of engineering and architectural drawings, posters and the like.

While a preferred embodiment of the invention has been described, the teachings of this invention will readily suggest many other embodiments to those skilled in the art. Accordingly, it should be understood that numerous alterations, omissions, and additions may be made without departing from the spirit thereof and the invention should be limited only as required by the scope of the following claims.

We claim:

1. Photographic apparatus comprising
   A. a support frame;
   B. means for mounting a data bearing medium containing data to be imaged on said support frame;
   C. means for supporting a length of photosensitive paper on said support frame in a position for printing;
   D. cassette means for supplying said length of photosensitive paper to said photosensitive paper support means, said cassette means including:
      1. a substantially enclosed housing defining an exit slot therein;
      2. a first cutting means affixed to said cassette means adjacent to and forming part of said exit slot;
      3. means for mounting a supply of photosensitive paper within said housing;
      4. a pair of rollers mounted within said housing for receiving the leading edge of said supply of photosensitive paper therebetween and for guiding said edge through said exit slot; and
      5. means coupled to said rollers for driving said length of photosensitive paper through said exit slot and onto said photosensitive paper support means;
   E. means for removably mounting said cassette means on said support frame;

F. means for projecting a focused image of the data contained on said data bearing medium on said supported length of photosensitive paper;

G. a second cutting means affixed to said support frame and positioned adjacent said exit slot for cooperating with said first cutting means for cutting said exposed length of photosensitive paper from said supply of paper directly adjacent said exit slot; and H. processing means for processing said exposed length of photosensitive paper.

2. Apparatus as recited in claim 1 wherein said first cutting means includes a stationary blade mounted to said cassette means adjacent said exit slot and extending at least the entire width of said paper; and wherein said second cutting means includes a cutting knife mounted to said support frame, said cutting knife comprising:

A. a rotatable disc-shaped cutting blade;
B. means for driving said cutting blade across the width of said photosensitive paper; and
C. means for biasing said cutting blade against said stationary blade for imparting rotation to said cutting blade as it is driven across the width of said paper to smoothly cut said paper.

3. Apparatus as recited in claim 2 wherein said cutting blade extends above the level of said paper to ensure proper cutting thereof.

4. Apparatus as recited in claim 1 wherein said pair of rollers include upper and lower rollers and are mounted adjacent said exit slot for preventing light from entering into said cassette.

5. Apparatus as recited in claim 1 wherein said roller drive means comprises drive means coupled to one of said pair of rollers for rotating said one roller to drive said photosensitive paper through said exit slot.

6. Apparatus as recited in claim 5 wherein said one roller includes a rod axially coupled thereto and extending outwardly of said cassette housing and said drive means includes a handle coupled to said rod for manually driving said roller in both a clockwise and counterclockwise direction.

7. Apparatus as recited in claim 5 wherein said one roller is provided with a rubber surface and the other roller is provided with a metal surface to provide good frictional contact with said paper fed between said rollers.

8. Apparatus as recited in claim 1 wherein said photosensitive paper support means comprises a pair of stationary upper and lower substantially parallel plates defining a narrow space therebetween and means associated with said plates for guiding said photosensitive paper into said narrow space.

9. Apparatus as recited in claim 8 wherein said guide means comprises a V-shaped opening formed by said plates.

10. Apparatus as recited in claim 8 wherein said upper plate comprises a transluscent viewing plate and wherein said image is projected onto the bottom surface of said viewing plate to be viewed from the top surface thereof in the absence of photosensitive paper in said narrow space.

11. Apparatus as recited in claim 10 wherein said lower plate comprises a transparent plate for supporting said photosensitive paper in a printing position while permitting light to pass therethrough.

12. Apparatus as recited in claim 1 wherein said means for projecting a focused image includes means for illuminating said data bearing medium more intensely around its periphery than at its center and means for receiving the light from said data bearing medium and for projecting an image of the data on said medium onto said supported length of photosensitive paper, said light receiving and projecting means including a vignetting ring for reducing the intensity of said image around its periphery by an amount sufficient to provide an image on said supported length of photosensitive paper that is of substantially uniform intensity throughout.

* * * * *